(12) United States Patent
Niu

(10) Patent No.: US 11,461,564 B2
(45) Date of Patent: Oct. 4, 2022

(54) CODE SCANNING TERMINAL FOR A BACK OF A HAND

(71) Applicant: XIAMEN PINNACLE ELECTRICAL CO., LTD., Xiamen (CN)

(72) Inventor: Leeming Niu, Xiamen (CN)

(73) Assignee: XIAMEN PINNACLE ELECTRICAL CO., LTD., Xiamen (CN)

( * ) Notice: Subject to any disclaimer, the term of this patent is extended or adjusted under 35 U.S.C. 154(b) by 32 days.

(21) Appl. No.: 17/119,421

(22) Filed: Dec. 11, 2020

(65) Prior Publication Data
US 2021/0182508 A1 Jun. 17, 2021

(30) Foreign Application Priority Data
Dec. 13, 2019 (CN) .......................... 201911280778.1

(51) Int. Cl.
*G06K 7/08* (2006.01)
*G06K 7/10* (2006.01)

(52) U.S. Cl.
CPC ......... *G06K 7/089* (2013.01); *G06K 7/10891* (2013.01); *G06K 2007/10534* (2013.01)

(58) Field of Classification Search
CPC ..... G06K 7/10891; G06K 2007/10534; G06K 7/089; G06K 7/10881; G06F 3/014
USPC ....................................... 235/462.44, 472.01
See application file for complete search history.

(56) References Cited

U.S. PATENT DOCUMENTS

| 9,235,742 | B1 * | 1/2016 | Qaddoura | G06K 7/1417 |
| 2009/0032560 | A1 * | 2/2009 | Strandberg | A45F 5/00 224/267 |
| 2012/0223143 | A1 * | 9/2012 | Turbovich | G06K 7/089 235/472.02 |
| 2018/0225489 | A1 * | 8/2018 | Liou | G06K 7/10544 |
| 2020/0272801 | A1 * | 8/2020 | Mistkawi | G06K 7/1408 |

FOREIGN PATENT DOCUMENTS

| KR | 2020122620 A * | 10/2020 | ......... G06K 7/10891 |
| WO | WO-2020075143 A1 * | 4/2020 | |

* cited by examiner

*Primary Examiner* — Suezu Ellis
(74) *Attorney, Agent, or Firm* — Muncy, Geissler, Olds & Lowe, P.C.

(57) ABSTRACT

The present invention relates to a technical field of the code scanning device, and in particular, to a handback-type code scanning terminal. The present invention discloses a handback-type code scanning terminal including a terminal body and a fixing member, the fixing member is used to fix the terminal body on a handback, a code scanning device and a gesture sensing device for triggering an on/off code scanning function of the code scanning device are disposed on the terminal body, the gesture sensing device is used to sense a lifting action of a thumb, and the thumb is a thumb of a hand for fixing the terminal body. The present invention does not have to use hands of an operator, and can release both hands of the operator to perform normal manual tasks, a code scanning operation is convenient, a working efficiency is improved, and a user experience is greatly improved.

11 Claims, 8 Drawing Sheets

CODE SCANNING TERMINAL FOR A BACK OF A HAND

TECHNICAL FIELD

The present invention belongs to a technical field of the code scanning device, and in particular, to a handback-type code scanning terminal.

BACKGROUND

As an important automatic identification information technology, barcode technology has been widely applied to retail, logistics distribution, chain operations, e-commerce, manufacturing and other fields. A current portable barcode scanning terminal is handheld. When using such a handheld code scanning terminal, an operator must hold the handheld code scanning terminal to scan a barcode on an article. The operation is relatively troublesome, and the operator needs to hold the handheld code scanning terminal from time to time to scan the barcode on the article, then puts the handheld code scanning terminal aside or puts it into a sleeve hung on a belt, and then performs other manual tasks with hands, such as a cashier, he/she must hold the handheld code scanning terminal frequently with a hand to scan barcodes of various commodities, and then frequently put down the handheld code scanning terminal to operate a keyboard of a cash register. Repeating such operations will easily cause fatigue and also affect improvement of working efficiency.

SUMMARY OF THE INVENTION

A purpose of the present invention is to provide a handback-type code scanning terminal that does not use hands and is easy to operate to resolve the above problem.

In order to realize the above purpose, a technical solution adopted by the present invention is: a handback-type code scanning terminal includes a terminal body and a fixing member, the fixing member is used to fix the terminal body on a handback, a code scanning device and a gesture sensing device for triggering an on/off code scanning function of the code scanning device are disposed on the terminal body, the gesture sensing device is used to sense a lifting action of a thumb, and the thumb is a thumb of a hand for fixing the terminal body.

Furthermore, the gesture sensing device is implemented using a capacitive sensor.

Furthermore, a bottom portion of the terminal body has an extension portion extending toward a slit between a thumb and a forefinger, and the gesture sensing device is disposed at an outer side surface of the extension portion.

Furthermore, the outer side surface of the extension portion is an arc surface concaved inwardly.

Furthermore, a bottom portion of the terminal body has an extension portion extending toward a slit between a thumb and a forefinger, and the gesture sensing device is disposed at an outer side surface of the extension portion.

Furthermore, the outer side surface of the extension portion is an arc surface concaved inwardly.

Furthermore, the fixing member is a fixing belt with an adjustable length.

Furthermore, the fixing belt is manufactured using a silicone material.

Furthermore, a number of the fixing belt is two, one is fixed at a palm, and the other one is fixed at a wrist.

Furthermore, a bottom surface of the terminal body is provided with an arc portion adapting to the handback.

Furthermore, a plurality of anti-sweat grooves is disposed on the arc portion.

Furthermore, the terminal body is further provided with a magnetic charging connector for charging the handback-type code scanning terminal.

Furthermore, the terminal body is further provided with a touch screen.

The advantageous effects of the present invention are as follows:

the present invention does not have to use hands of an operator, and can release both hands of the operator to perform normal manual tasks. A code scanning operation is convenient, a working efficiency is improved, and a user experience is greatly improved.

BRIEF DESCRIPTION OF THE DRAWINGS

In order to explain the technical solutions of the embodiments of the present invention more clearly, the figures required to be used in the description of the embodiments will be introduced briefly below. Obviously, the following described figures are merely some of the embodiments of the present invention, and other figures may be obtained according to these figures by those ordinarily skilled in the art without exerting any creative effort.

DETAILED DESCRIPTION OF THE EXEMPLARY EMBODIMENTS

Figure 1:
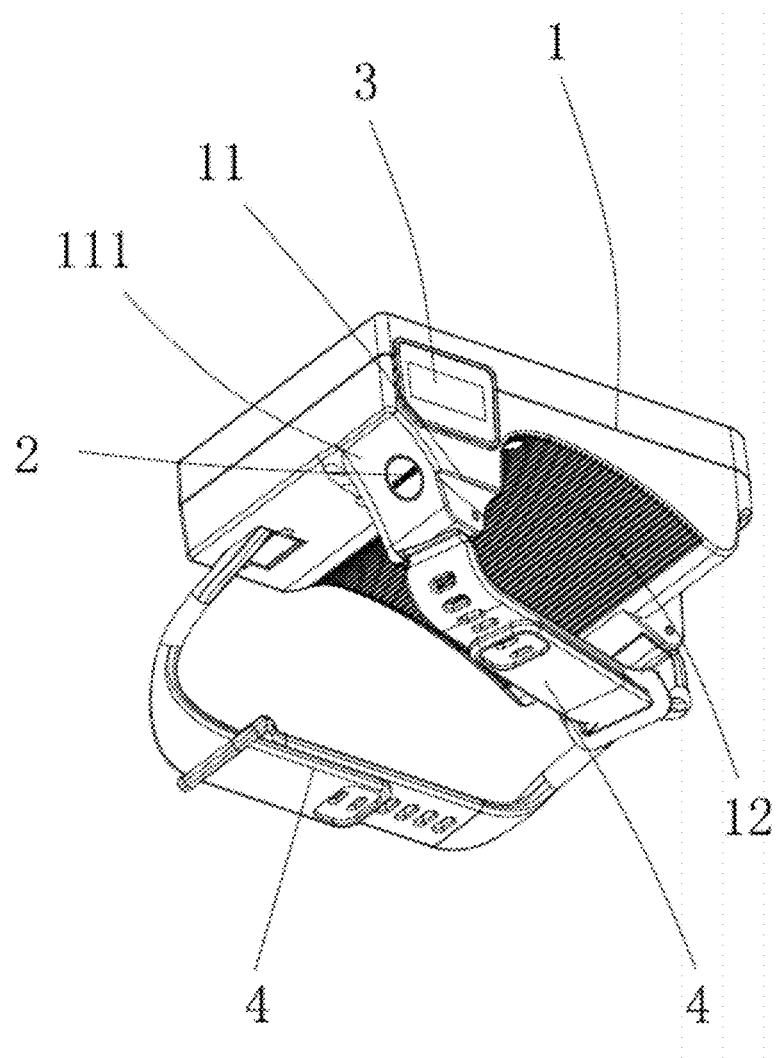
FIG. 1 is a stereoscopic structural diagram of a specific embodiment of the present invention.

The present invention provides accompanying drawings in order to further illustrate respective embodiments. These drawings are a part of the contents disclosed by the present invention, which are mainly used to illustrate the embodiments and can explain an operation principle of the embodiments in cooperation with the relevant depiction in the description. With reference to these contents, those ordinarily skilled in the art should understand other possible embodiments and the advantages of the present invention. The components in the drawings are not drawn in proportion, and similar component symbols are generally used to represent similar components.

Now the present invention is further described in conjunction with the drawings and the exemplary embodiments. It should be noted that the term "handback-type code scanning terminal" is explained as "code scanning terminal for a back of a hand", that is, the code scanning terminal is used or applied on the back of one's hand.

Figure 2:
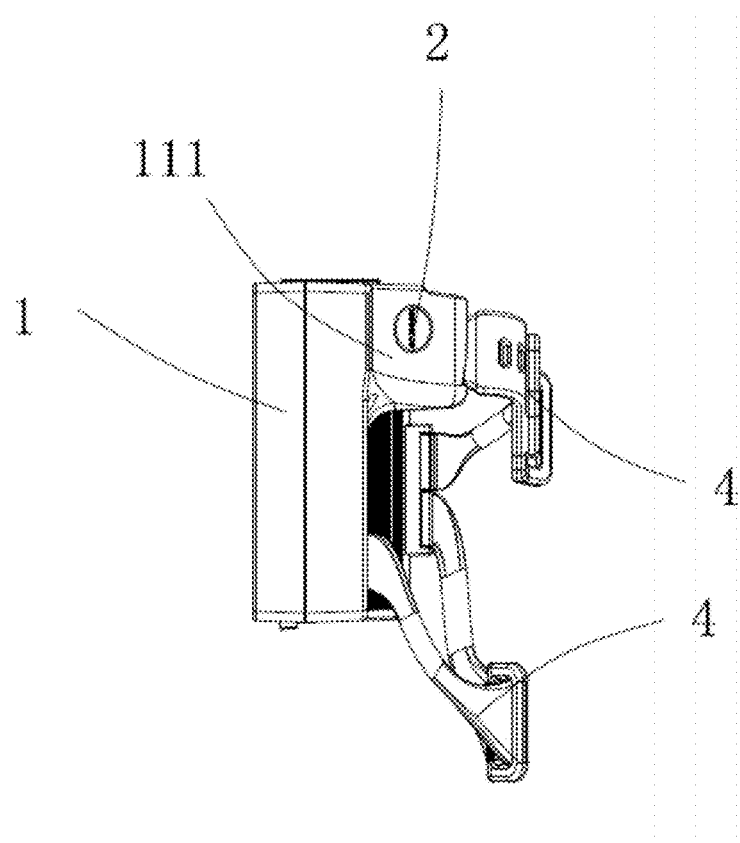
FIG. 2 is a left view of the specific embodiment of the present invention.
Figure 3:
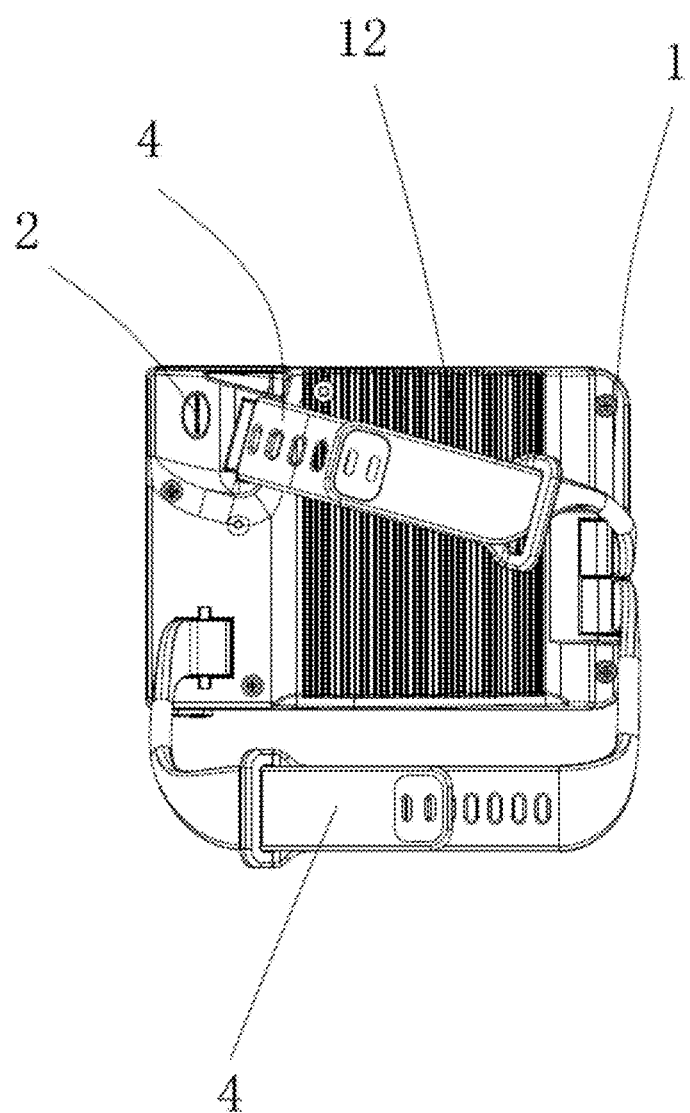
FIG. 3 is a bottom view of the specific embodiment of the present invention.
Figure 4:
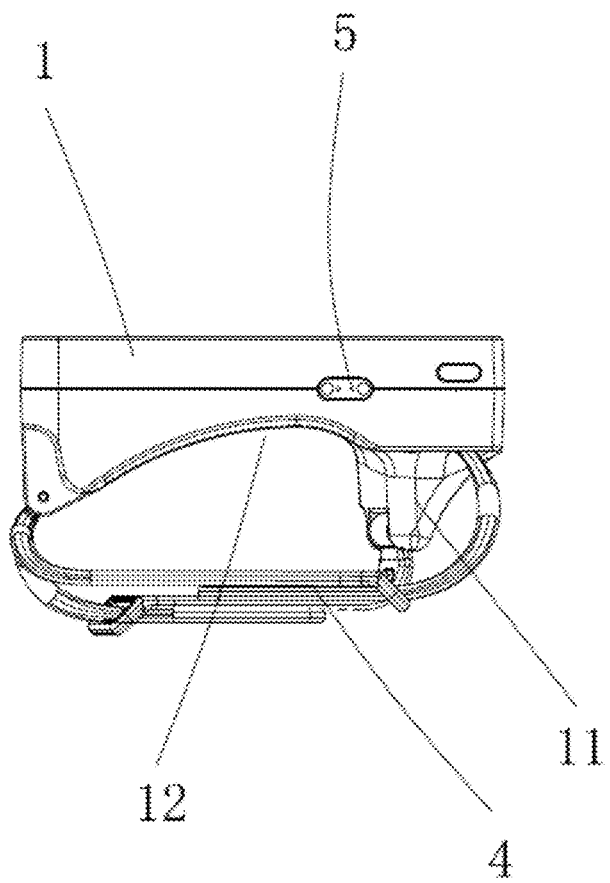
FIG. 4 is a rear view of the specific embodiment of the present invention.
Figure 5:
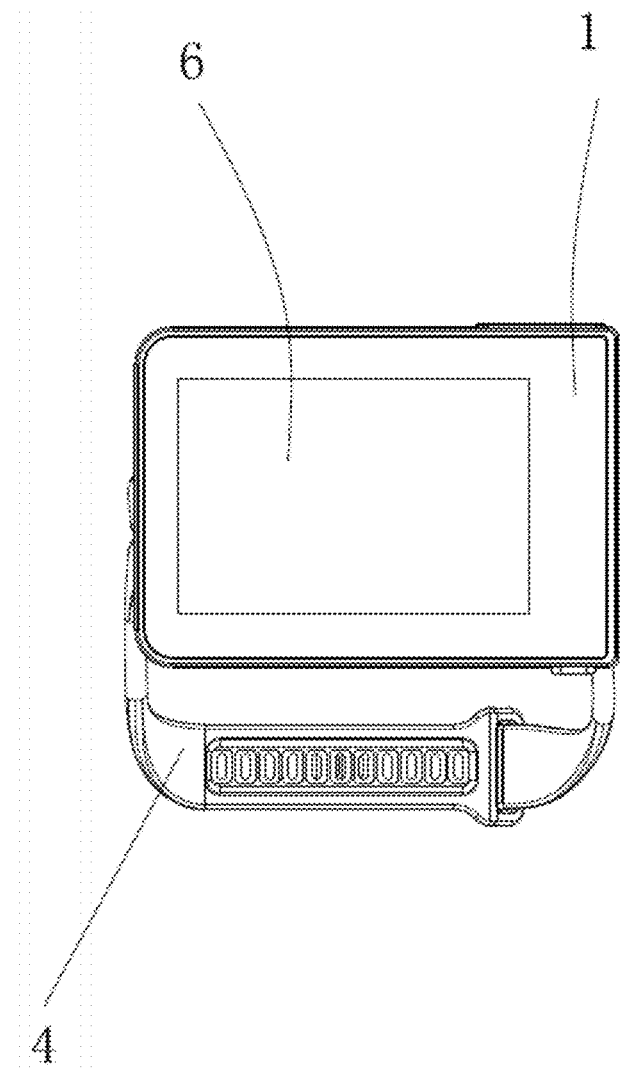
FIG. 5 is a top view of the specific embodiment of the present invention.
Figure 6:
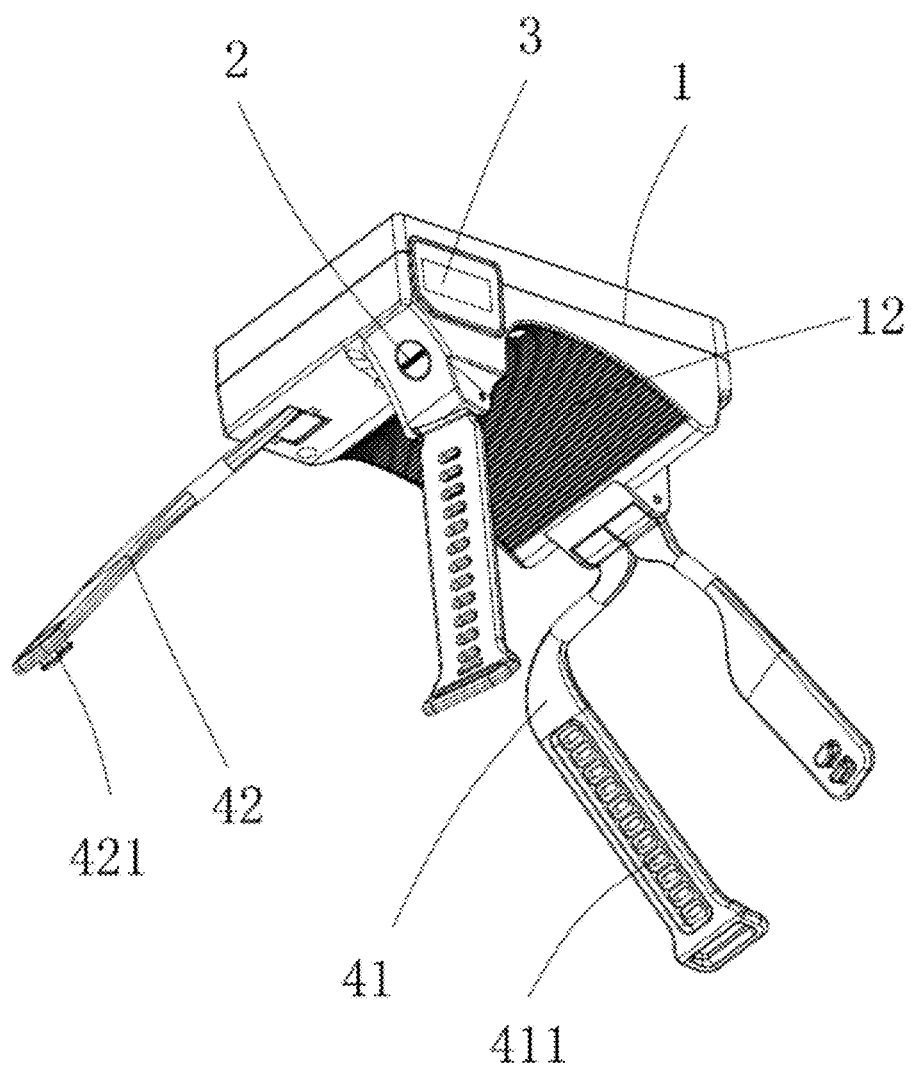
FIG. 6 is a structural schematic diagram I in a state in which a fixing belt is untied of the specific embodiment of the present invention.
Figure 7:
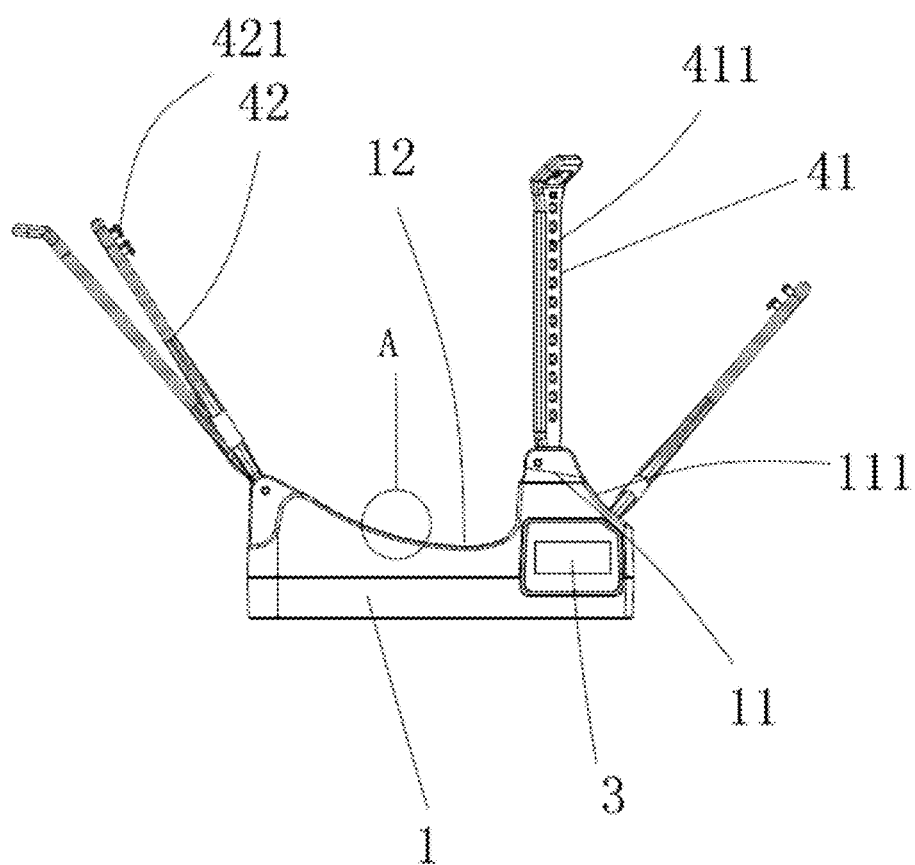
FIG. 7 is a structural schematic diagram II in the state in which the fixing belt is untied of the specific embodiment of the present invention.
Figure 8:
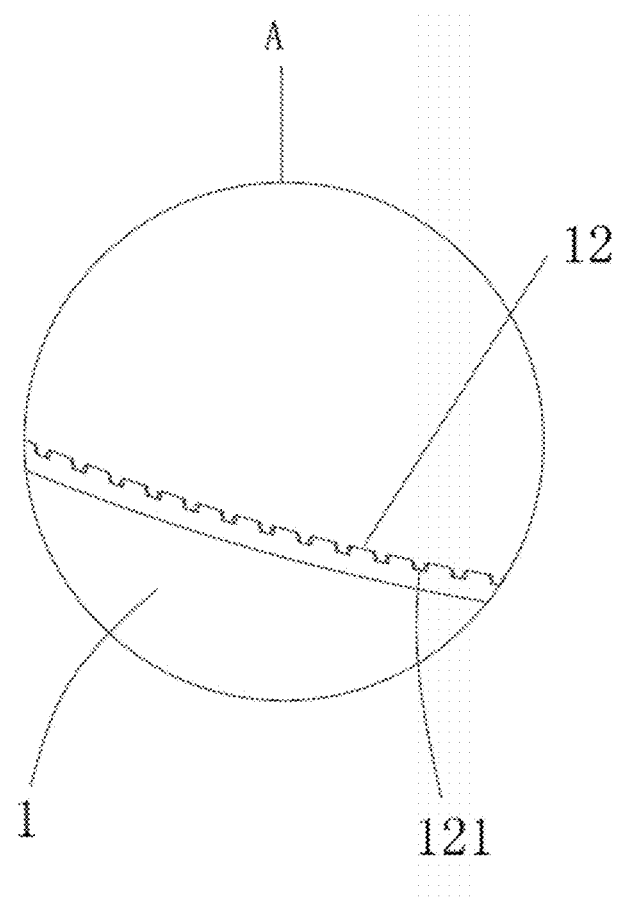
FIG. 8 is an enlarged view of a part A of FIG. 7.

As shown in FIGS. 1-8, a handback-type code scanning terminal includes a terminal body 1 and a fixing member, the fixing member is used to fix the terminal body 1 on a handback. In the present specific embodiment, it is fixed on a left handback, but is not limited hereto, and in other embodiments, it may also be disposed to be fixed on a right handback.

A code scanning device and a gesture sensing device 2 for triggering an on/off code scanning function of the code scanning device are disposed on the terminal body 1, the gesture sensing device 2 is used to sense a lifting action of a thumb, and the thumb is a thumb of a hand for fixing the terminal body 1, i.e., a thumb of the left hand. The gesture sensing device 2 is used to start the code scanning device, and in comparison with using a current mechanical button to start the code scanning device, there is no need to press with a force, an operation is more rapid and convenient, and it is less likely to be damaged.

The gesture sensing device 2 senses a lifting action of the thumb to trigger an on/off code scanning function of the code scanning device, startup and shutdown operations can be completed with a single hand without cooperation of the other hand, and it is better to free up both hands to perform other manual tasks. With respect to other fingers, a thumb has greater freedom of movement and more flexible movements, which makes a triggering operation more convenient and comfortable, improves the user experience, and is easily implemented.

In the present specific embodiment, the terminal body 1 is substantially in a cuboid structure so that a whole structure is more compact and small, but is not limited hereto. In other embodiments, a shape of the terminal body 1 can be selected according to actual needs.

In the present specific embodiment, the code scanning device is a code scanning device that scans a barcode, please refer to a code scanning device of a current handheld barcode scanning terminal for its specific structure, which will not be illustrated in details here. Certainly, in other embodiments, the code scanning device can also be a code scanning device that scans a QR code or other information codes.

In the present specific embodiment, a scanning head 3 of the code scanning device is disposed on a front surface of the terminal body 1, and is convenient to scan a barcode, which is not limited hereto.

In the present specific embodiment, the gesture sensing device 2 is preferably implemented using a capacitive sensor, such as a capacitive sensor of model HT4, which is easily implemented and has a low cost. Certainly, in other embodiments, the gesture sensing device 2 can also be implemented using an infrared detection sensor, an optical detection sensor or the like.

In the present specific embodiment, a bottom portion of the terminal body 1 has an extension portion 11 extending toward a slit between a thumb and a forefinger, and the gesture sensing device 2 is disposed at an outer side surface of the extension portion 11. Disposing the extension portion 11 makes the gesture sensing device 2 be closer to the thumb and easier to sense the lifting action of the thumb.

Furthermore, in the present embodiment, the outer side surface of the extension portion 11 is an arc surface 111 concaved inwardly so that the lifting action of the thumb is more smooth.

In the present specific embodiment, the fixing member is a fixing belt 4, which has a simple structure, is easy to be implemented, and has a low cost. Certainly, in other embodiments, the fixing member can also be implemented using other existing fixing manners.

Preferably, in the present embodiment, a length of the fixing belt 4 is adjustable so that it can adapt to hands of different sizes. Specifically, in the present embodiment, the fixing belt 4 consists of two sub fixing belts 41 and 42, first ends of the two sub fixing belts 41 and 42 are respectively connected fixedly to the terminal body 1, a second end of one sub fixing belt 41 is provided with a plurality of clamping holes 411 that are spaced apart from one another along a length direction, and a second end of the other sub fixing belt 42 is provided with a buckle. The length of the fixing belt 4 can be adjusted by buckling the buckle 421 into different clamping holes 411, and the adjustment is simple and convenient, but is no limited hereto. In other embodiments, it can also be implemented using other belts having adjustable lengths.

In the present specific embodiment, the fixing belt 4 is preferably manufactured using a silicone material, which has a good anti-sweat performance, is more comfortable to wear, and improves the user experience.

Preferably, in the present specific embodiment, a number of the fixing belt 4 is two, one is fixed at a palm, and the other one is fixed at a wrist, which improves stability.

In the present specific embodiment, a bottom surface of the terminal body 1 is provided with an arc portion 12 adapting to the handback so that the terminal body 1 can be fixed on the handback more stably and comfortably.

Furthermore, in the present embodiment, the arc portion 12 is provided with anti-sweat grooves 121 to prevent sweat and improve wearing comfort.

Specifically, in the present embodiment, the number of the anti-sweat grooves 121 is plural, and they are disposed to be parallel to and spaced apart from each other. The anti-sweat groove 121 is disposed along a front-rear direction, and both ends thereof respectively penetrate to front and rear surfaces of the terminal body 1, which can improve a ventilation effect to thereby improve the anti-sweat effect, and is easily manufactured, but is not limited hereto.

In the present specific embodiment, the terminal body 1 is further provided with a magnetic charging connector 5 for charging the handback-type code scanning terminal. Using the magnetic charging connector 5 not only has a good effect of preventing water and dust and a charging connector that is not easily damaged, but also has a simple charging operation. The magnetic charging connector 5 has been a very mature existing technology, please refer to the existing technology for details, which will not be illustrated in details here.

In the present specific embodiment, the magnetic charging connector 5 is disposed at a rear surface of the terminal body 1, which makes the charging convenient and cannot affect beauty, but is not limited hereto.

In the present specific embodiment, the terminal body 1 is further provided with a touch screen 6, the touch screen 6 is connected with the code scanning device to display related information and input information, for example, inputting the number or performing function options etc. Specifically, in the present embodiment, the touch screen 6 is a capacitive touch screen, which has a low cost and is easily implemented, but is not limited hereto.

The touch screen 6 is preferably disposed on an upper surface of the terminal body 1, so that the structure design is more reasonable and compact, viewing and inputting operations are more convenient. But it is not limited hereto.

Working Process:

When in use, the terminal body 1 is fixed on the left hand by the fixing belt 4, both hands can perform normal manual tasks, when it needs to scan the code, the thumb is lifted to a position of the gesture sensing device 2 to be sensed by it, the gesture sensing device 2 transmits a sensing signal to the code scanning device, the code scanning device starts a code scanning function, then the scanning head 3 is aligned with a barcode to be scanned to scan the code, after the code scanning is completed, the thumb is lifted to the position of the gesture sensing device 2 again to be sensed by it, the gesture sensing device 2 transmits a sensing signal to the code scanning device, and the code scanning device shutdown the code scanning function to avoid error code scanning while reducing power consumption.

The present invention does not have to use hands of an operator, and can release both hands of the operator to perform normal manual tasks, a code scanning operation is convenient, a working efficiency is improved, and a user experience is greatly improved.

Although the present invention is presented and introduced in conjunction with the preferable implementation solution, those skilled in the art should understand that various changes that can be made to the prevention in forms and details without departing from the spirit and scope defined in the accompanying claims should be included in the protection scope of the present invention.

What is claimed is:

1. A code scanning terminal for a back of a hand, comprising: a terminal body on which a code scanning device and a gesture sensing device for triggering an on/off code scanning function of the code scanning device are disposed, and at least one fixing member for fixing the terminal body on the back of the hand, wherein the gesture sensing device is used to sense a lifting action of a thumb; wherein a bottom surface of the terminal body is provided with an arc portion adapting to the back of the hand, and a plurality of anti-sweat grooves are disposed on the arc portion.

2. The code scanning terminal for a back of a hand of claim 1, wherein: the gesture sensing device is implemented using a capacitive sensor.

3. The code scanning terminal for a back of a hand of claim 2, wherein: a bottom portion of the terminal body has an extension portion, and the gesture sensing device is disposed at an outer side surface of the extension portion.

4. The code scanning terminal for a back of a hand of claim 3, wherein: the outer side surface of the extension portion is an arc surface concaved inwardly.

5. The code scanning terminal for a back of a hand of claim 1, wherein: a bottom portion of the terminal body has an extension portion, and the gesture sensing device is disposed at an outer side surface of the extension portion.

6. The code scanning terminal for a back of a hand of claim 5, wherein: the outer side surface of the extension portion is an arc surface concaved inwardly.

7. The code scanning terminal for a back of a hand of claim 1, wherein: each fixing member is a fixing belt having an adjustable length.

8. The code scanning terminal for a back of a hand of claim 7, wherein: the fixing belt is manufactured using a silicone material.

9. The code scanning terminal for a back of a hand of claim 7, wherein: two fixing belt are provided.

10. The code scanning terminal for a back of a hand of claim 1, wherein: the terminal body is further provided with a magnetic charging connector for charging the code scanning terminal.

11. The code scanning terminal for a back of a hand of claim 1, wherein: the terminal body is further provided with a touch screen.

* * * * *